United States Patent Office 3,157,582
Patented Nov. 17, 1964

3,157,582
NUCLEAR REACTOR MODERATOR STRUCTURES
René Babule, Gif-sur-Yvette, Georges Lemesle and Roger Martin, Paris, and Pierre Rougé, Gif-sur-Yvette, France, assignors to Commissariat à l'Energie Atomique, Paris, France
Filed Oct. 13, 1959, Ser. No. 846,080
Claims priority, application France, Oct. 18, 1958, 776,971
7 Claims. (Cl. 176—84)

This invention relates to nuclear reactors of the heterogeneous type having stacked elements of solid moderator material formed with vertical ducts at least some of which contain nuclear fuel.

The active portion or core of such a reactor generally comprises a comparatively large-sized block of moderator material, such as graphite or glucina (beryllium oxide) and this block is required to possess considerable mechanical strength and stability in order to remain serviceable over long periods (of the order of at least twenty years), without collapsing or breaking up under the severe stresses imposed on it in service. These stresses are of various kinds, the chief ones, in addition to the material's own weight, being thermal deformation and the so-called Wigner effect. The latter introduces deformations which increase with neutron flux density and decrease with irradiation temperature, and the amount of deformation, i.e., contraction and expansion, attributable thereto can attain an order of several percent. Moreover, dynamic stresses are set up by the friction of the heat-exchange fluid circulating through the ducts. Certains additional effects may further impair the solidity of the structure, such as pitch and roll in the case of shipboard installations, seismic shocks in some parts of the world, and so on.

The above and similar factors tend to impair the proper operation of a reactor primarily in that they disrupt the straight, smooth and continuous character of the fuel and fluid circulating ducts, and the ducts for the safety rods of retarding material, thus causing neutron leakage and inefficient and/or unsafe operation.

It is an object of this invention to provide improved solid moderator structure for use in nuclear reactors, whereby the mechanical stability and rigidity of the moderator, and that of the reactor as a whole, will be greatly enhanced, and service life correspondingly prolonged.

Specific objects are to provide solid moderator structure wherein the moderator elements are so arranged and supported that the elements will be enabled to undergo dimensional deformation (expansion and contraction) under the action of such causes as temperature variations and Wigner effect, in a manner that will not impair the strength of the structure as a whole and will not tend to cause misalignment between elements. A further object is to provide a novel solid moderator structure which will be comparatively easy to dismantle and reassemble progressively, in part or in whole, especially by remote control methods.

The invention provides a moderator structure as part of a nuclear reactor, which comprises a plurality of parallel, substantially juxtaposed bars of moderator material having adjacent sides, and cooperating longitudinal keying means in said adjacent sides for interconnecting said bars laterally into a unitary structure.

The invention further provides a moderator structure comprising a plurality of substantially juxtaposed columns of moderator material each comprising a stack of generally aligned similar prismatic bars, longitudinal keyways formed in sides of said bars and key means engaging said keyways to interconnect both the adjacent bars in said columns and the adjacent columns into a unitary structure.

Preferably the moderator bars are of prismatic shape with a hexagonal cross sectional contour. In this case the keying means are preferably positioned to extend substantially along the center lines of the faces of the prismatic bars, although they might alternatively be positioned along arrises of the prisms. While the cooperating keys and keyways may assume various forms in cross section, a simple and satisfactory shape is that wherein said cross section is rectangular. The keying means may comprise separate key members insertable in grooves formed in the sides of the bars, or they may comprise longitudinal ribs projecting integrally from one bar and into a complementary groove in another bar. In the former case, the longitudinal interconnection between adjacent bars of a given column is preferably obtained by causing each key member to have part of its length positioned in engagement with one bar of said column and another part in engagement with an adjacent bar of the same columns. In the above-mentioned case where the keys are formed integrally with the bars, such longitudinal interconnection would be obtained by staggering the bars as between adjacent columns, so that a keying rib projecting from one bar of one column would have different parts of its length interengaging with grooves in different, adjacent, bars of an adjacent column.

Sufficient clearance is provided between the adjacent columns, and also between the cooperating keying means therebetween to allow each column to expand and contract radially independently of the expansion and contraction of adjacent columns.

According to another feature, the moderator structure thus provided is preferably encased in a rigid metallic casing which in turn is enclosed in the conventional sealed tank or container, but is substantially independent from the latter structurally. In other words the casing preferably simply rests on the bottom of the tank. The objects, features and advantages of the invention will appear as the description proceeds with reference to specific embodiments selected for purposes of illustration but not of limitation. In the accompanying drawings.

Figure 4:
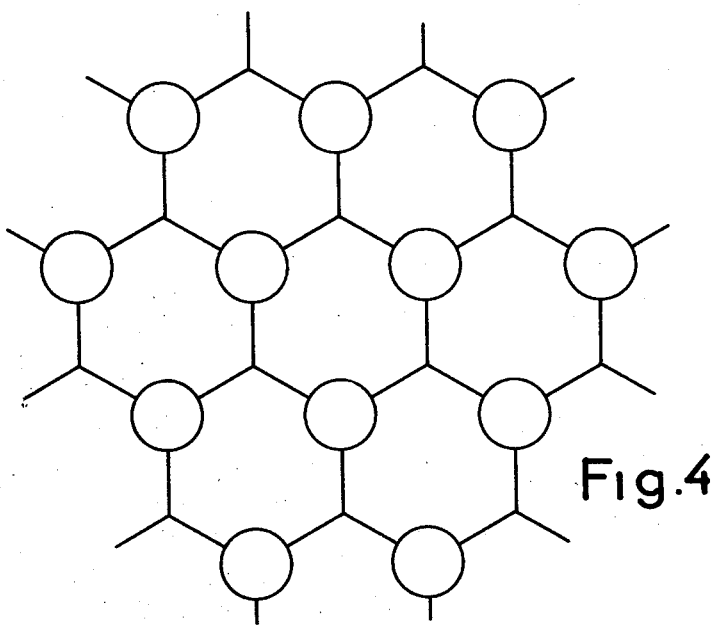
Figure 5:
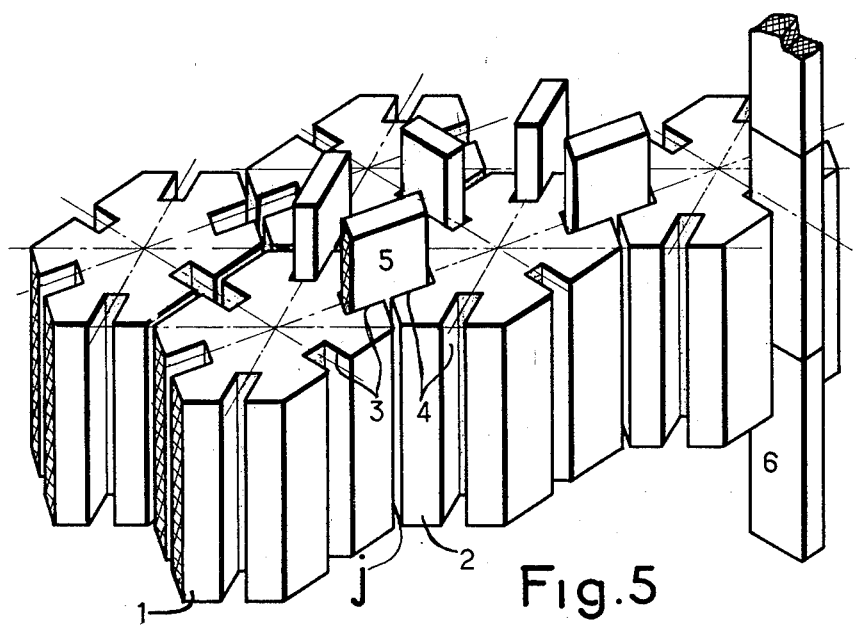
Figure 6:
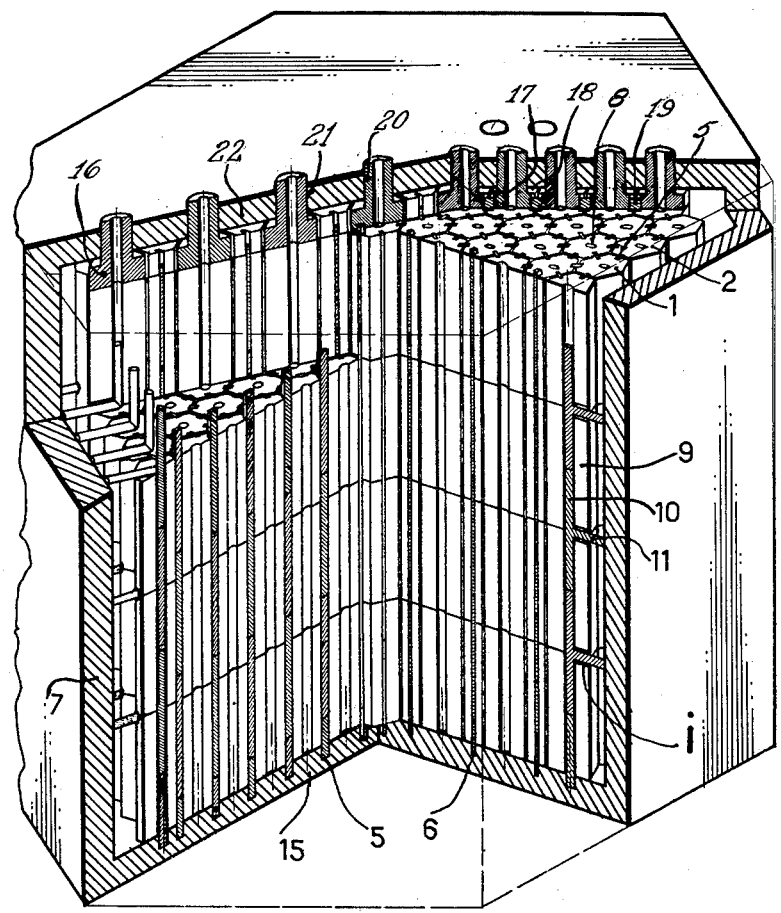
Figure 7:
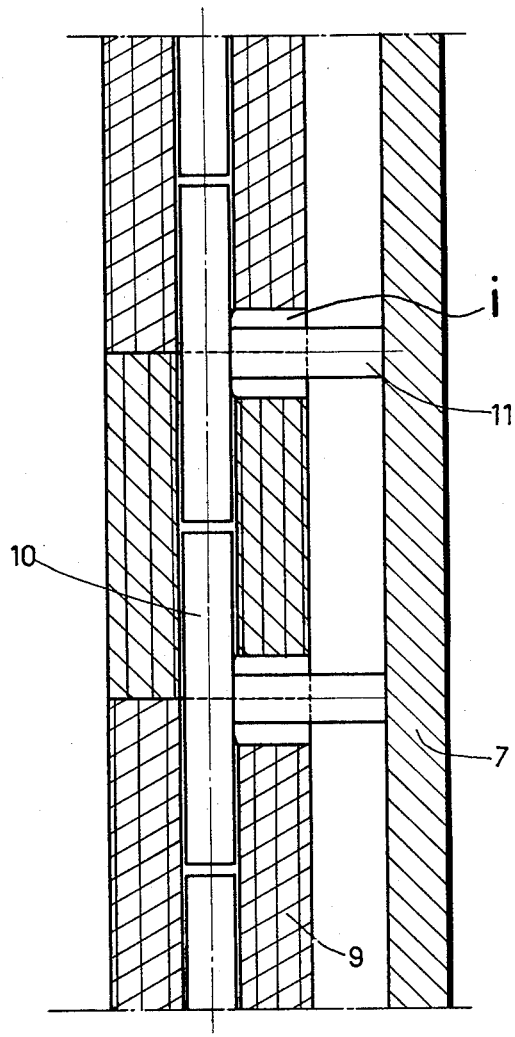
Figure 8:
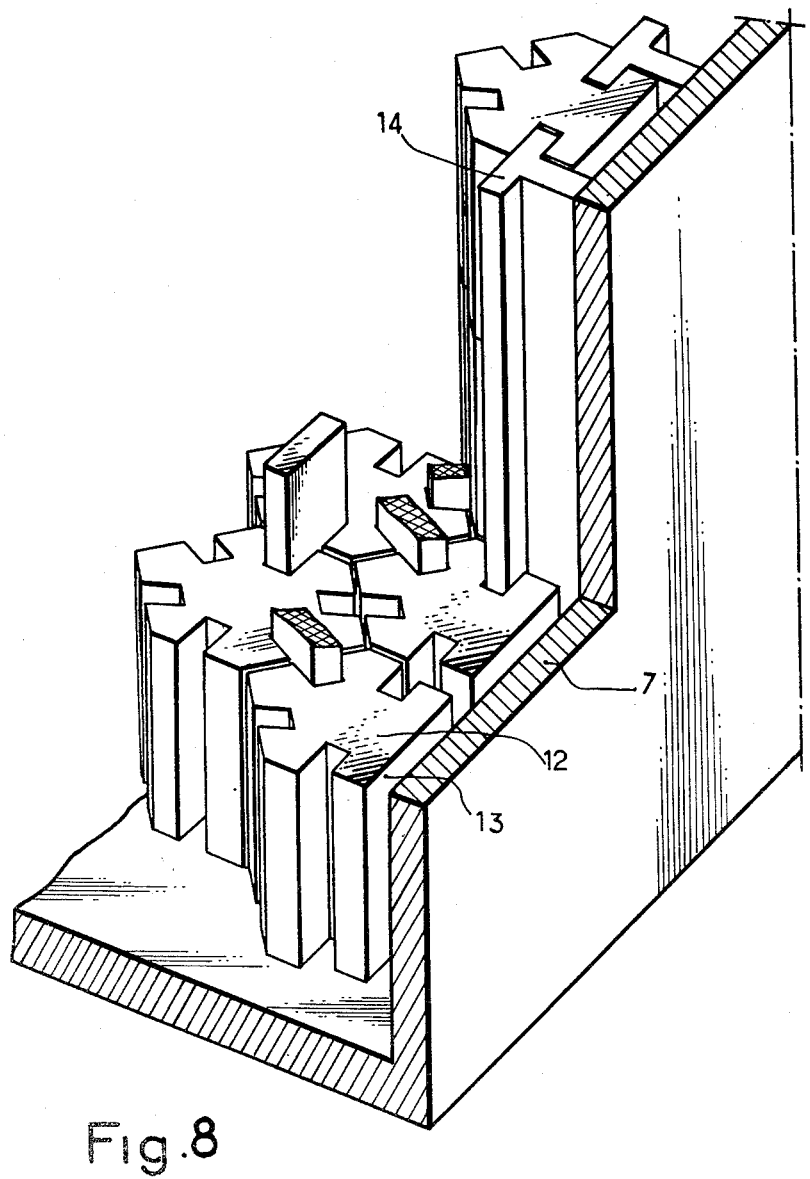
Figure 9:
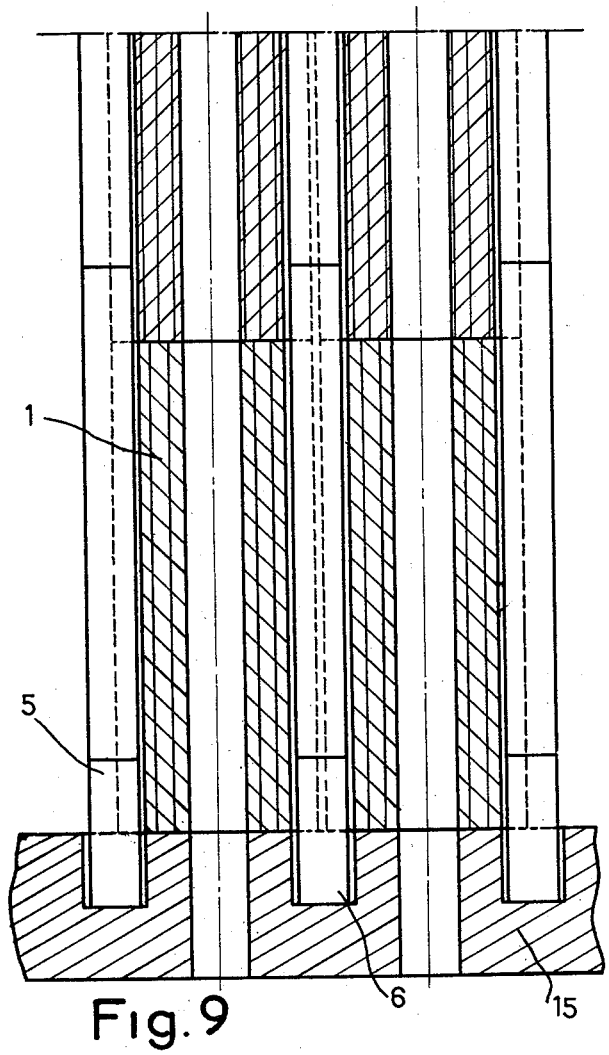
Figure 10:
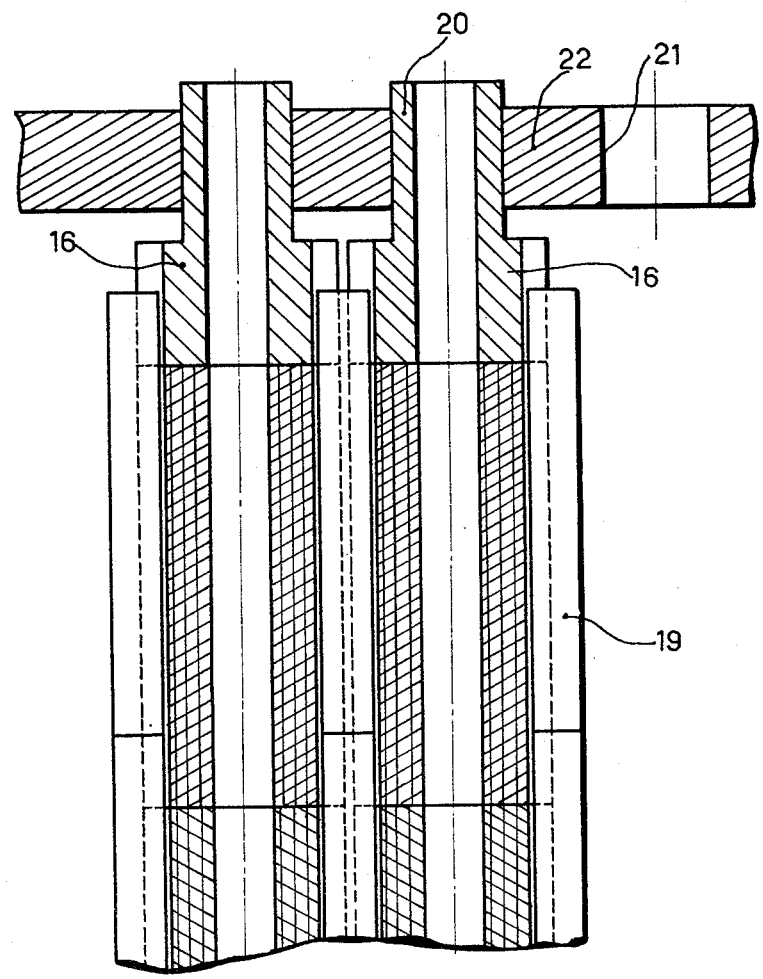
Figure 12:
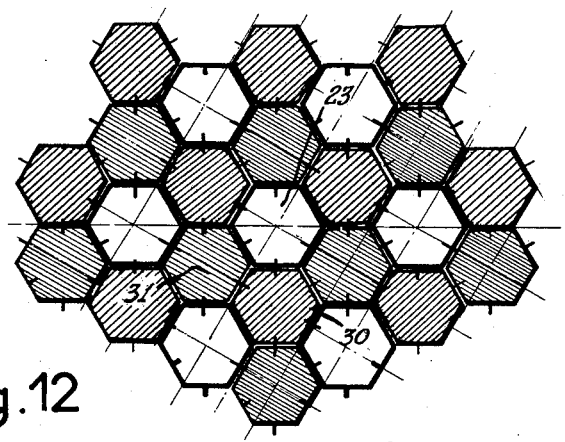
Figure 11:
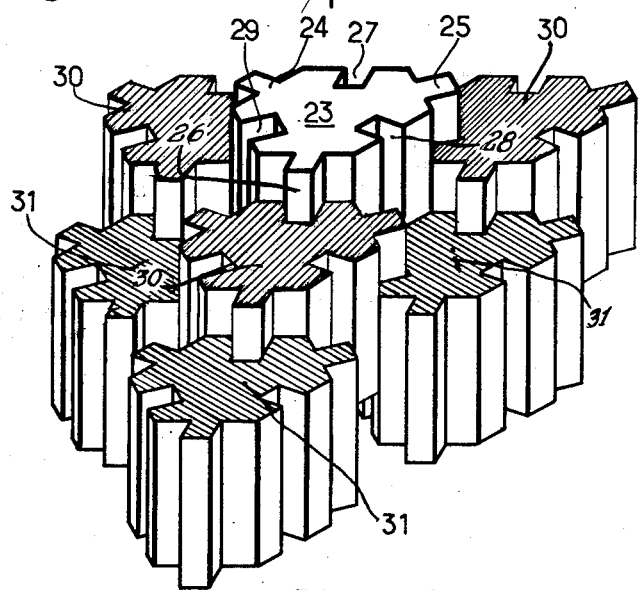

FIG. 4 similarly illustrates another position of the ducts;

FIG. 5 is a perspective view illustrating a fragment of the moderator structure with one form of keying means according to the invention;

FIG. 6 is a perspective view, broken away and with parts in section, showing on a smaller scale than the foregoing views a substantially complete nuclear moderator structure of the invention;

FIG. 7 is a large-scale sectional view illustrating the connecting means with the casing side walls in FIG. 6;

FIG. 8 is a fragmentary perspective view illustrating connecting means with a casing side wall according to a modification;

FIG. 9 is a view similar to FIG. 7 illustrating the bottom connecting means in the structure of FIG. 6;

FIG. 10 similarly illustrates the top connecting means;

FIG. 11 is a perspective view of a fragment of a moderator structure according to a modified form of the invention wherein the key members used are integral with the bars; and FIG. 12 is a simplified plan view corresponding to FIG. 11.

Figure 1:
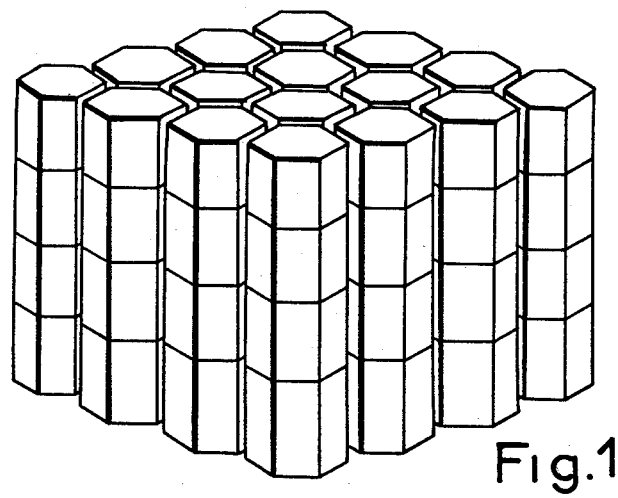
FIG. 1 is a simplified perspective view of a fragment of a moderator structure according to the invention.

Referring to FIG. 1, it will be seen that a moderator structure according to the invention comprises a stack of horizontal arrays of elements, in the form of prismatic bars or bricks of hexagonal cross section, so as to define a number of juxtaposed vertical columns. The columns are spaced from one another laterally to provide clearance spaces (see "j" in FIG. 5) of uniform magnitude, a major function of which is to allow for the swelling of the elements as a result of Wigner effect.

It should be noted that it is desirable to minimize migration of neutrons from the central area in which neutron efficiency is highest, towards the peripheral areas where such efficiency drops off, and it is hence desirable to limit the propagation of neutrons through the gaps between the bars.

Figure 2:
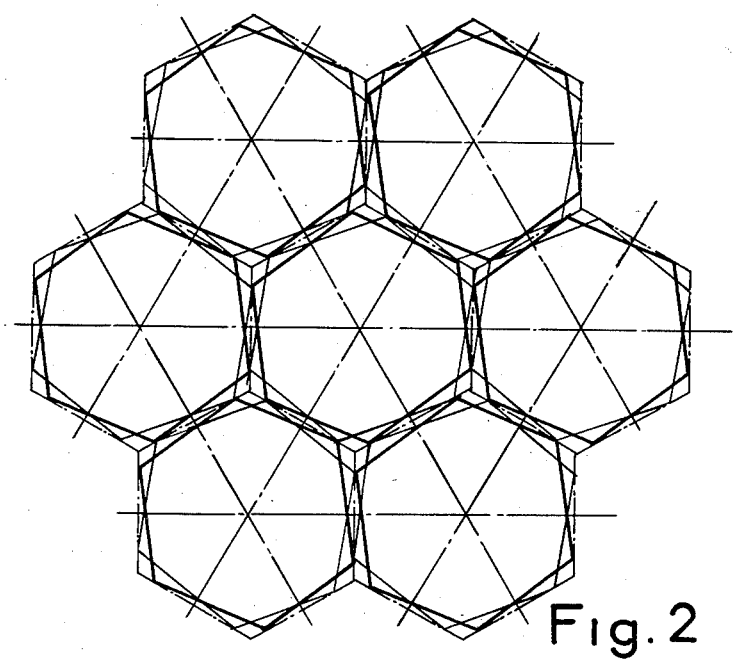
FIG. 2 is a diagram of the structure as viewed in plan, and illustrating the alternate angular displacements or "swing" imparted to the moderator elements in one form of the invention.

While with the arrangement shown there is no possibility of neutron leakage in the horizontal plane owing to the hexagonal pattern used, in the vertical direction neutron leakage remains possible through the clearance gaps between adjacent columns. To minimize such leakage the following arrangement is preferably used according to the invention. The elements in successive flat arrays or beds in the stack are alternately displaced angularly about their axes in opposite directions by a small uniform angle, of the order of a few degrees. Thus, in one bed each of the hexagonal elements would be rotated clockwise, and in both adjacent beds each element would be rotated counterclockwise. The angular displacement or "swing" thus imparted to the elements should be selected with a minimum value such that the neutron leakage section, instead of being rectangular as it would be in the absence of such swing, assumes the form of a rhomboid (inscribed within such rectangle), as is apparent from the diagram of FIG. 2. The rhomboidal leakage area may still further be reduced by forming cutouts at the base and top of each element thereby to prevent any mutual interference that might otherwise be caused by differential expansion in the vertical direction between adjacent bars.

Figure 3:
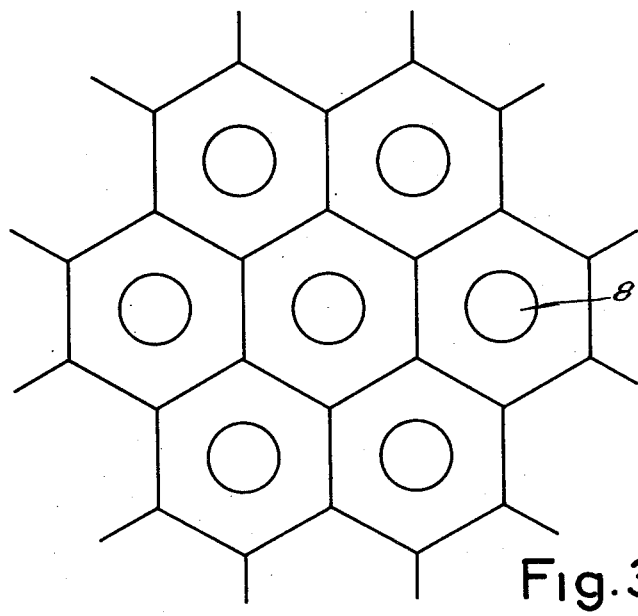
FIG. 3 is a similar view illustrating one possible mode of positioning the nuclear fuel ducts in the moderator.

According to the invention, any of various geometrical patterns may be used for the insertion of the nuclear fuel into the moderator structure thus described. The fuel elements are received in vertical ducts formed through the columns. As shown in FIG. 3, one possible arrangement is to position the fuel-receiving ducts 8 axially of the respective hexagonal columns. FIG. 4 illustrates another possible arrangement, wherein the fuel ducts are each positioned with its axis at the junction between the adjacent sides of three adjacent hexagons. In this case it will be noted that every other apex of each hexagonal element is truncated or recessed arcuately, the three recesses participating in forming a cylindrical duct.

According to an important feature of the invention, the vertical columns of the moderator structure are firmly assembled with one another by means of a set of key members fitted into longitudinal grooves formed in the faces of the hexagonal elements, with each key received partly in registering grooves of adjacent elements so as to bond the elements both transversely and longitudinally. Thus as shown in FIG. 5, each bar element shown at 1 and 2 is formed in each of its six side faces with a longitudinal groove 3 or 4. The grooves are so arranged that their midplanes are substantially aligned with the center axes of the bars, which center axes constitute the nodes of the centered hexagonal network pattern of the moderator. Inserted in the grooves are the key members such as 5 and 6, each of which is the proper width to fit partly into transversely registering grooves of two adjacent bars in the bed under consideration, as will be apparent esecially for key member 5; further, as will be seen in connection with key member 6, the members are arranged lengthwise to fit partly in the groove of a bar lying in one bed, and partly into a registering groove of a corresponding bar in an adjacent bed, thereby firmly interconnecting the respective beds into a unitary structure. If desired, the key members may extend continuously throughout all the flat beds of the moderator stack. In any case, it will be understood that in the preferred form of the invention each key member interconnects at least four adjacent hexagonal bar elements in at least two adjacent beds.

If the above described preferred feature of alternate angular displacement of the bar elements in adjacent beds is applied, then it will be understood that the keyways or grooves 3, 4 should be slightly displaced from the midpoints of the sides of the hexagons to allow for such angular displacement. However, the side faces of the keyways should be parallel to the vertical planes extending through the axes of the hexagonal prisms. After the prisms have been assembled as shown in FIG. 1, the keys are inserted into the registering keyways (FIG. 5). Each key is a close fit laterally in its keyway. On the other hand, a substantial clearance space is provided between the each inner edge of a key and the adjacent inner end wall of its keyway, as will be apparent for key 5 in FIG. 5, such clearance space being slightly greater than the clearance "j" provided between adjacent bars to allow for expansion.

Where the moderator elements are made from a moderator material of anisotropic character, such as graphite, the keys should be cut so that their main dimension will be parallel to the predominant orientation of the material. This will promote homogeneous Wigner expansion and the dimensional tolerances of the key and keyway assemblies will be retained after prolonged exposure to radiation. The same applies to the hexagonal moderator elements of the invention, which also are referably cut on planes parallel to the direction of predominant orientation of the moderator material.

As shown in FIG. 6, the moderator structure is encased in an outer casing 7 of rigid metallic construction, which in turn may be contained within the conventional sealed container (not shown) but is preferably structurally independent therefrom. That is, said casing 7 rests upon the bottom of the sealed tank without substantially any other connection between the two. The moderator block may be suitably connected with the base wall of the casing 7 as later described or may simply be applied thereon by its own weight. While the casing 7 may be in the form of a rigid cage structure with peripheral metal bars connecting the base with the top of the moderator stack, it is shown in FIG. 6 as comprising a solid metal casing integral with the base of the moderator stack. As shown in FIG. 6, the lateral connection between the moderator structure and the casing 7 may be provided as follows:

Inserted through the axial ducts of the outermost columns 9 of the stack are rods 10, which overlap as shown with respect to the elements of each column. Extending from each rod 10 through spaces therefor between the adjacent elements 9, are transverse connector members 11 which project outwardly for connection with the casing 7. Preferably, differential thermal expansion between the stack elements and the casing, in the vertical direction, is allowed for by permitting the connector elements 11 to deflect a limited amount up and down from the horizontal plane, for which purpose clearance spaces "i" are provided between the adjacent beds of elements 9. This is more clearly shown in the detailed view of FIG. 7.

FIG. 8 illustrates an alternative form of lateral connecting means between the moderator structure and its casing 7. Here the outermost bar elements 12 of the moderator structure are formed with a truncated cross section so as to present continuous flat vertical faces 13 directed outwards to lie in parallel spaced relationship with the inner surface of the casing 7. Elongated connector keying members 14 in the form of T-shaped profiled sections are inserted into keyways of the bars 12 and into the longitudinal spaces defined in adjacent truncated bars 12 as will appear clearly from the drawing. This arrangement has an advantage in that much of the superfluous peripheral parts of the moderator assembly, which do not participate in the nuclear process, are eliminated thereby enabling reduction in the over-all horizontal dimension and floor space.

The connection between the base of the moderator stack and the floor 15 of the casing 7 is illustrated in FIGS. 6 and 9 as comprising a number of recesses formed in the floor portion 15 and receiving the lower ends of the lowermost key members 5 and 6 therein.

As also appears from FIG. 6, overlying the top of each vertical column of the moderator is a metal block 16 which conforms in horizontal cross section with that of the moderator bars. Longitudinal grooves vertically aligned with the keyway grooves in said bars are formed in the sides such as 17, 18 of each block. Inserted in the grooves of the blocks are the upper portions of keys 19 which project beyond the top plane of the uppermost bed or layer of moderator bars. Each block 16 is formed with an upward cylindrical extension 20. As more clearly shown in FIG. 10, the extensions 20 are slidable in bores 21 formed therefor in the top wall 22 of the casing 17.

FIG. 11 illustrates a modified form of moderator structure acording to the invention wherein the keying means interconnecting the bar elements are formed integrally with the bar elements. Thus, each bar 23 is formed, on three non-adjacent ones of its six sides, with longitudinal ribs 24, 25, 26 while the remaining three sides of it are formed with complementary grooves 27, 28, 29 adapted to receive therein the ribs of adjacent bar elements. In this modification, the longitudinal or vertical interconnection between the respective arrays or beds of the moderator structure is accomplished by staggering the bars in a vertical direction. Thus, FIG. 11 shows that the adjacent bars such as 23, 30 and 31 have their upper faces lying at three different levels. This configuration is further illustrated in FIG. 12, wherein the bars 23 having their upper end faces lying in an uppermost plane ar shown unhatched, the bars 30 at an intermediate level are shown with closely spaced cross-hatching, and the bars 31 at the lowermost level have moderately spaced hatching.

The invention as described in some of its embodiments has a number of outstanding advantages. The resulting moderator structure is highly stable mechanically since each bar is positively interlatched with the neighbouring bars thorugh the keying means provided. Should any bar tend to be displaced for any reason, it will take fulcrum through the medium of the keying means upon the six surrounding bars, each of which in turn will against further surrounding bars, and so on with the outermost bars pressing against the rigid surrounding casing which will easily take up the strain and prevent the undersized displacement from occurring.

Furthermore, the ducts will at all times remain continuous and tightly sealed in operation, mainly owing to the fact hat no over-all Wigner expansion is able to take place since each vertical column will expand separately around its own axis. Thus, Wigner effect in the pile will be manifested merely as a tendency for all initially provided clearance spaces to become filled in, but the pitch, i.e., inter-element spacing, of the structure will not be affected.

While said spacing may tend to be affected by thermal expansion in the base and/or top walls of the surrounding rigid casing provided in the invention, such tendency may be reduced to a negligible amount by a suitable selection of the constituent materials of said casing walls, desirably made of low-expansion alloy, and/or by the provision of means for maintaining the temperature variations of said base and top walls of the casing within a reasonable range, as by forced cooling fluid circulation therearound.

An essential advantage of the invention lies in the fact that each fuel duct has its axial position connected at its bottom and upper ends with the surrounding casing 7, as previously explained. Moreover, owing to the lateral keying means, the axial positions of said fuel ducts are laterally held stationary with reference to the sides of the casing. Thus, differential thermal expansion between the moderator and its casing will not tend to disrupt the continuiy of the fuel ducts. The axes of the ducts follow the thermal expansion of the casing, resulting in a sort of low-amplitude "respiration" of the structure. The ducts remain rectilinear and there will be no tendency to leakage due to "gaping" as would occur should some of the moderator bars become deflected with respect to others.

The columns are independent of one another in the vertical direction. They are hence able to expand freely under combined thermal and Wigner effects, with differential vertical expansion amplitudes, without destroying the rectilinear character of the ducts and without relative displacement of the bars. Hence, leakage between adjacent beds will not tend to occur.

A further important advantage is the ease with which the moderator stack can be dismantled and reassembled, one column after another, as by remote operating means. Such operations are especially simplified in the case of those embodiments of the invention, as previously described, wherein the keyway grooves are continuous throughout the vertical extent of the structure, and the keys are integral with the bars, as e.g., in FIG. 11. However, also with the other embodiments of the invention that have been described, dismantling and reassembling operations can easily be performed owing to the columnar arrangement used.

It will be understood that various modifications, other than those specifically illustrated and described, may be applied within the scope of the invention. Thus, while a hexagonal cross sectional contour is preferred, the moderator bars may be provided in the form of prisms having other, preferably regular, contours, e.g., triangular. Also, various of the features disclosed may be applied independently of others.

What we claim is:

1. In a nuclear reactor moderator structure, a plurality of spaced moderator columns, a plurality of regular prismatic superimposed bars of moderator material having lateral planar faces axially disposed in each said columns, a duct in certain of said bars extending axially through at least certain of said columns, keying means connecting two adjacent bars in a column and connecting at least one bar in an adjacent column, said means being disposed along a lateral face of each of the connected bars with its median plane passing through the axes of the connected columns and connecting the bars for free independent axial and radial expansion and contraction of the columns when subjected to radiation without breaking the ducts, and rigid means for mechanically securing the periphery of the plurality of columns.

2. In a nuclear reactor moderator structure, a plurality of spaced moderator columns, a plurality of regular prismatic superimposed bars of moderator material having lateral planar faces axially disposed in each of said columns, a duct in certain of said bars extending axially through at least certain of said columns, keying means connecting two adjacent bars in a column and connecting at least one bar in an adjacent column, said means being disposed along a lateral face of each of the connected bars in the plane including the axes of the connected columns and connecting the bars for free independent axially and lateral expansion and contraction when subjected to radiation without breaking the ducts, said means including radial longitudinal grooves in substantially the middle of the lateral faces of each bar, a parallelopipedal key mounted with sliding fit in each of said grooves and extending between at least two adjacent bars in the same column and into adjacent grooves in the adjacent column, said keys and said grooves extending from the top to the bottom of said columns, space being provided between each key and the bottom of its respective grooves accommodating expansion during the use of the reactor.

3. In a nuclear reactor moderator structure, a plurality of spaced moderator columns, a plurality of regular prismatic superimposed bars of moderator material having lateral planar faces axially disposed in each of said columns, a duct in certain of said bars extending axially through at least certain of said columns, keying means connecting two adjacent bars in a column and connecting at least one bar in an adjacent column, said means being disposed along a lateral face of each of the connected bars in the plane including the axes of the connected columns and connecting the bars for free independent axial and lateral expansion and contraction when subjected to radiation without breaking the ducts, said means including radial longitudinal grooves in substantially the middle of alternate faces of each of said bars, integral radial longitudinal ribs on the other face of each of said bars, each of said ribs engaging with sliding fit in the adjacent grooves of two superimposed adjacent bars in the adjacent column, space being provided between each of said ribs at the bottom of the grooves receiving the ribs accommodating expansion during use of the reactor.

4. In a nuclear reactor moderator structure, a plurality of spaced moderator columns, a plurality of regular prismatic superimposed bars of moderator material having lateral planar faces axially disposed in each of said columns, a duct in certain of said bars extending axially through at least certain of said columns, keying means connecting two adjacent bars in a column and connecting at least one bar in an adjacent column, said means being disposed along a lateral face of each of the connected bars with its median plane passing through the axes of the connected columns and connecting the bars for free independent axial and lateral expansion and contraction of the columns when subjected to radiation without breaking the ducts, and rigid means for mechanically securing the periphery of the columns, said securing means including a rigid polygonal casing surrounding said columns, said keying means connecting said bars adjacent said casing and including an extension for each of said keying means in engagement with said casing.

5. In a nuclear reactor moderator structure, a plurality of parallel adjacent columns, a plurality of prismatic axially superimposed bars of moderator material having lateral faces and in direct contact one with the other in each of said columns, a duct extending throughout at least certain of said columns, longitudinal keyways formed in the lateral surfaces of and extending the length of said bars and keymeans disposed in the plane including the axes of the connected columns slidably engaging the lateral walls of the keyways to connect the bars laterally, radial clearances being provided between adjacent columns and between cooperating keymeans and keyways whereby free lateral expansion of the bars is permitted, said keymeans extending the length of said columns and extending in at least three different directions from each of said columns.

6. In a nuclear reactor moderator structure, a plurality of parallel adjacent spaced moderator columns, a plurality of prismatic superimposed bars in direct contact one with the other having radial symmetry in each of said columns, a duct extending throughout at least certain of said columns and means connecting each bar to at least one bar in an adjacent column and to at least one bar in the same column, said means including longitudinal radially directed keyways formed in the lateral surface of said bars and keymeans disposed in the plane including the axes of the connected columns slidably engaging the lateral walls of the keyways to connect the bars laterally, radial clearance being provided between cooperating keymeans and keyways whereby free lateral expansion of the bars is permitted, said keymeans extending in at least three different directions from each of said columns and said keyways and said keymeans extending the length of said columns.

7. In a nuclear reactor moderator structure, a plurality of right prismatic parallel adjacent bars of moderator material having a regular hexagonal cross-section, at least three longitudinal keyways formed in the lateral surfaces of each of said bars and extending the length of said bars and having their midplanes directed in three different directions, each including the bar axis, and keymeans disposed in the plane including the axes of the connected bars slidably engaging the lateral walls of the keyways and extending the length of said keyways to connect the bars laterally, radial clearances being provided between adjacent bars and between cooperating keymeans and keyways.

References Cited by the Examiner

UNITED STATES PATENTS

| 2,780,596 | 2/57 | Anderson | 176—58 |
| 2,807,580 | 9/57 | Fenning et al. | 176—26 |
| 2,852,457 | 9/58 | Long et al. | 176—84 |
| 2,863,815 | 12/58 | Moore et al. | 176—29 |
| 2,872,398 | 2/59 | Ashley et al. | 176—84 |
| 2,907,706 | 10/59 | Horning et al. | 176—21 |
| 2,998,364 | 8/61 | Stubbs et al. | 176—84 |
| 3,020,226 | 2/62 | Hackney | 176—84 |
| 3,022,239 | 2/62 | Rodwell | 176—84 |
| 3,069,343 | 12/62 | Martin | 176—84 |

FOREIGN PATENTS

| 1,037,036 | 8/58 | Germany. |
| 1,211,573 | 10/59 | France. |

OTHER REFERENCES

Etherington: Nuclear Engineering Handbook, 1958, pages 13–38, McGraw-Hill Book Co., Inc.

Nucleonics, December 1957 (vol. 15, No. 2), foldout between pages 36 and 37.

Glasstone: Principles of Nuclear Reactor Engineering, July 1955, page 486.

CARL D. QUARFORTH, *Primary Examiner*.

ROGER L. CAMPBELL, LEON D. ROSDOL,
*Examiners.*